United States Patent [19]

Coonradt

[11] Patent Number: 4,723,618
[45] Date of Patent: Feb. 9, 1988

[54] SWING-OUT BATTERY BOX

[75] Inventor: Joel A. Coonradt, Ankeny, Iowa

[73] Assignee: Deere & Company, Moline, Ill.

[21] Appl. No.: 20,277

[22] Filed: Mar. 2, 1987

[51] Int. Cl.[4] .............................................. B60R 18/02
[52] U.S. Cl. .................................... 180/68.5; 312/328
[58] Field of Search ................ 180/68.5, 298; 429/84;
312/322, 323, 325, 328; 105/51

[56] References Cited

U.S. PATENT DOCUMENTS 2,607,433  8/1952  Simi ..................................... 180/68.5
4,591,002  5/1986  Meinert .............................. 172/510
4,630,431  12/1986 Schlueter et al. ...................... 56/28

FOREIGN PATENT DOCUMENTS 612493  11/1948  United Kingdom ............... 180/68.5

Primary Examiner—John J. Love
Assistant Examiner—Richard Camby

[57] ABSTRACT

A battery box including parallel four-bar linkage structure for permitting a battery to be swung downwardly and outwardly, from an operative position wherein the battery is protected by the implement frame, to a maintenance position wherein easy access is provided to the battery for inspection and maintenance. The parallel linkage structure maintains the battery horizontal and serves as a self-locking mechanism at the desired maintenance position. A finger guard on the four-bar linkage also acts as a stop to limit travel of the battery when the battery is returned to its normal operative position.

6 Claims, 2 Drawing Figures

SWING-OUT BATTERY BOX

BACKGROUND OF THE INVENTION

The present invention relates generally to mobile vehicles requiring an electrical system with a battery, and more specifically to a support arrangement for a battery which permits the battery to be stored in a protective compartment on the vehicle during normal operation and to swing outwardly from the compartment for access during maintenance of the battery.

Many vehicles, such as self-propelled agricultural implements, require a battery which must be accessible for recommended scheduled maintenance. Part of normal maintenance requires that the operator be able to look into the cells from the top at a safe distance to observe fluid level. Also, the cables and the posts on the battery must be accessible for cleaning. The battery as well should be accessible for periodic replacement.

In some implements, the only easily accessible area suitable for supporting the battery is in the engine compartment. However, heat from the engine can lead to premature battery failure. In other implements, the battery is stored in a fixed compartment attached to the vehicle frame. Often it is necessary to support the battery outwardly from the implement frame where it can hinder access to or maneuverability of the implement, or otherwise it is necessary to support the battery where access to the battery posts and cells is severely limited.

OBJECTS OF THE INVENTION

It is therefore an object of the present invention to provide an improved battery storage structure. It is a further object to provide such a structure which permits the battery to be located in a protected area when in a normal operating position and to be easily repositionable to an accessible area for servicing.

It is yet another object of the present invention to provide battery support structure which both provides safe and reliable support of the battery in the operating position as well as accessibility to the battery when in the maintenance position for cleaning cables and posts and for observing the cells of the battery. It is a further object to provide such a structure which is self-locking in the maintenance position and which is easily returnable to the operating position. It is a further object to provide such structure wherein in the operating position the battery may be located in a well protected area for maximum battery life.

BRIEF DESCRIPTION OF THE INVENTION

In accordance with the above objects, a swing-out battery box is supported by four-bar linkage structure pivotally connected to the implement frame. In the operating position, the box is confined to a compartment inside the implement and away from the engine for protection of the battery. A pair of screws are used to maintain the four-bar linkages in the operating position. By removing the screws, the mechanism can be pivoted outwardly and downwardly. The parallel linkages maintain the battery in a normal upright position ensuring safety for the operator and preventing fluid from leaking out. The bars of the four-bar linkage contact when the battery box reaches the desired maintenance position to provide an automatic locking feature. In the maintenance position, the cells are easy to view, and access is provided to easily inspect and clean the cables and mating posts on the battery. Finger guards are connected to one of the bars of the pair of bars of the four-bar linkages to prevent fingers from being pinched in the linkage and to also act as a stop to limit upward travel to the operating position of the battery.

These and other objects, features and advantages of the present invention will become apparent to those skilled in the art from the description which follows and from the drawings.

DESCRIPTION OF THE PREFERRED EMBODIMENT

Figure 1:
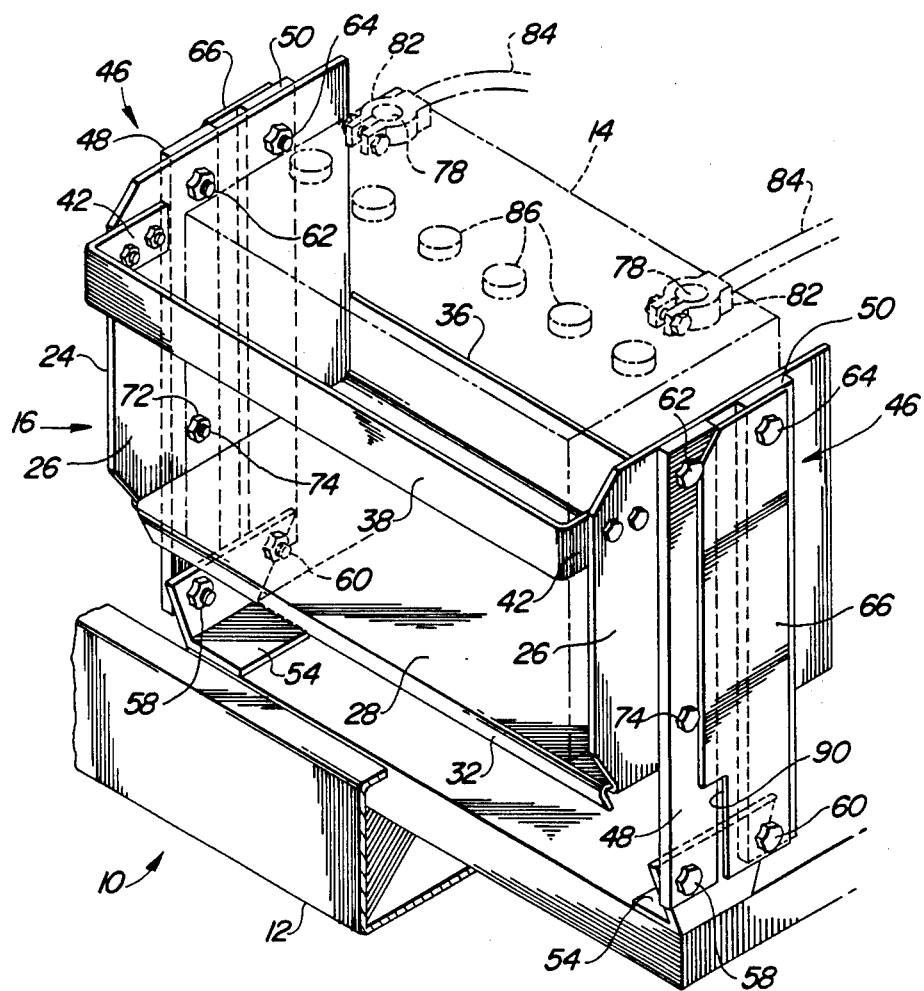
FIG. 1 is a side perspective view of the battery box of the present invention with a battery supported therein in the operative position.
Figure 2:
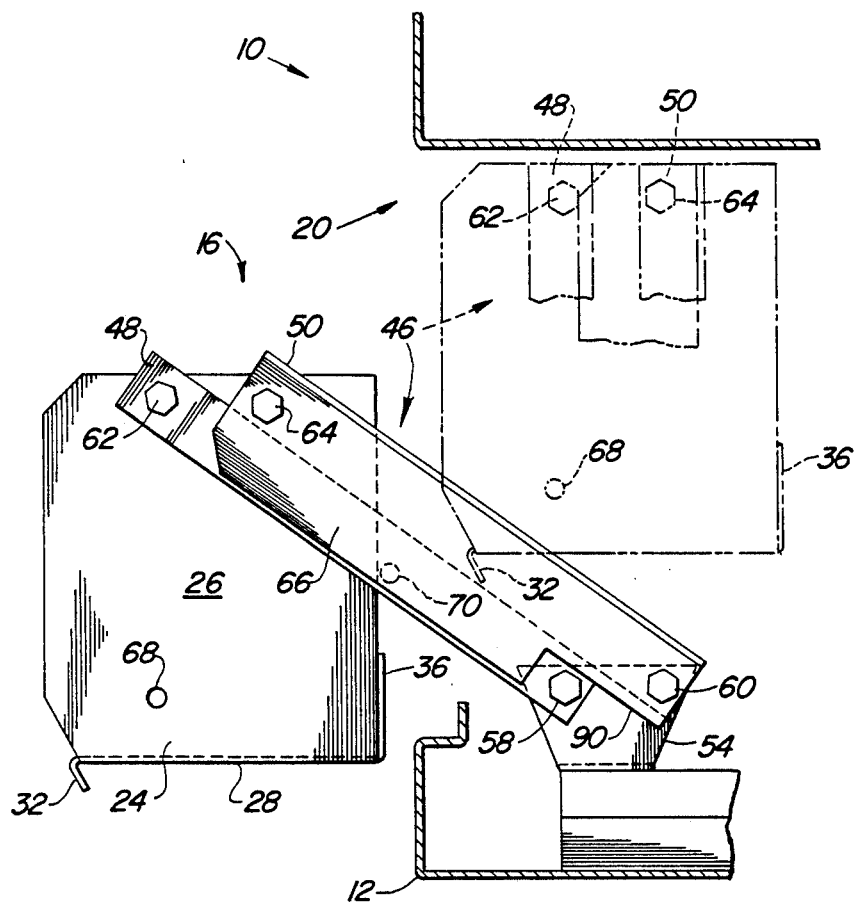
FIG. 2 is a side view of the battery box in FIG. 1 showing the box in the maintenance position (solid lines) and in the operative position (broken lines) wherein the battery is protected by the compartment on the vehicle.

Referring to FIG. 1, there is shown a portion of a self-propelled vehicle indicated generally at 10 and including a frame 12 defining an engine compartment (not shown) such as is typical on a self-propelled cotton harvester or other similar implement. A battery 14 is supported from the frame 12 by battery support structure 16 for movement between an operative position (FIG. 1) and a maintenance position (solid lines of FIG. 2). Preferably the battery support structure 16 is mounted on the frame 12 in an area of the vehicle away from the engine compartment. As best seen in FIG. 2, the vehicle frame 12 defines a protective compartment area 20 which extends inwardly from the outermost portion of the frame 12. The compartment area 20 opens outwardly toward the side of the frame 12. The battery support structure 16 is mounted with respect to the compartment 20 such that when the battery 14 is in the normal operative position, the battery is protected by the implement frame. The battery support structure 16 permits the battery to be swung outwardly and downwardly to the maintenance position (FIG. 2) wherein the battery is clear of the protective compartment area 20 for easy access to cables and cells.

The battery support structure 16 includes a box 24 having upright side legs 26 connected by a lower horizontal floor portion 28 having a front reinforcing flange 32. A rear wall portion 36 extends between the lower rear portions of the side legs 26. A strap 38 extends between the upper forward portions of the side legs 26 and includes angled portions 42 which are bolted to the side legs 26. The box 24 is supported from the frame 12 by a pair of four-bar linkage structures 46. Each linkage structure 46 includes a pair of front and rear parallel bars 48 and 50, respectively, having lower ends pivotally connected to a support angle 54 by bolts 58 and 60, respectively. The upper ends of the bars 48 and 50 are pivotally connected to the upper end of the respective side leg 26 by bolts 62 and 64. When the battery box 24 is in the operative position within the compartment 20, the front and rear bars 48 and 50 are substantially vertical and are spaced a distance slightly less than the width of the bars from each other. As the box 24 is swung outwardly and downwardly, the linkage structures 46 maintain the box in a level condition. When the box 24 reaches the maintenance position shown in FIG. 2 clear of the protective compartment areaa 20, the forward edge of the rear bar 50 contacts the rearward edge of the front bar 48 for each linkage structure 46 to prevent further rocking of the box 24 outwardly from the frame 12 and to rigidly support the box 24 in the maintenance position.

An upright plate 66 is connected to each of the rear bars 50 by the bolts 60 and 64 to shield the area between the bars 48 and 50. The width of the plate 66 is selected such that when the box 24 reaches the storage position as shown in FIG. 1, the front edge of the plate 66 contacts the upper bolt 62 of the link 48. This contact automatically stops the battery support structure 16 in the storage position. A hole 68 is provided near the lower forward portion of the side leg 26, and a corresponding hole 70 in the front bar 48 aligns with the hole 68 when the structure 16 is in the operative position. A nut 72 is welded to the inside of the side leg 26 at the hole location 68, and a screw 74 is inserted through the hole 68 and 70 and threaded into the nut 72 to secure the support structure 16 in the operative position.

In the operative position, the battery 14 is protected by the compartment area 20 and by the box 24. The battery 14 includes terminals 78 which receive clamps 82 on the ends of conductors 84. The battery also has serviceable cells indicated generally at 86. To gain access to the terminals 78, clamps 82 and cells 86, the operator simply removes the screws 74 and rocks the battery box 24 downwardly and outwardly as shown in FIG. 2. The operators then has unobstructed access to the top of the battery. After inspection and/or maintenance of the battery, the operator pushes the box 24 upwardly and rearwardly to the operative position and reinserts the bolts 74 to lock the battery in the protective compartment area 20. As best seen in FIG. 2, the upright plate 66 is notched at 90 to accommodate the bolt 58 as the battery box 24 pivots downwardly and outwardly to the maintenance position.

Having described the preferred embodiment, it will be apparent that modifications can be made without departing from the scope of the invention as defined in the accompanying claims.

I claim:

1. In a vehicle including a battery compartment for receiving a battery, said battery compartment normally limiting access to the battery, battery support structure permitting convenient access to the batery for inspection and servicing of the battery, said support structure comprising:

a battery holder adapted for receiving the battery in an upright supportive position;

elongated four-bar linkage structure having first and second ends;

means for rockably connecting the first end of the linkage structure to the vehicle adjacent the battery compartment;

means connecting the second end of the linkage structure to the battery holder for permitting the battery holder to rock between a normal operative position generally within the compartment and a service position wherein the holder extends outwardly from the compartment;

stop means for maintaining the battery holder in a preselected attitude in the service position; and plate means fixed to one of the bars of the four-bar linkage for shielding the area between adjacent bars as the holder is rocked between positions.

2. The invention as set forth in claim 1 wherein the stop means comprises a portion of the four-bar linkage structure.

3. The invention as set forth in claim 1 wherein the plate means includes second stop means for preventing further rocking of the battery holder upon the holder being rocked to the operative position.

4. In a vehicle having an engine, battery support and protective structure comprising: a protective compartment area located away from the engine and opening outwardly, upright four-bar linkage structure pivotally connected to the compartment area, a battery support adapted for receiving a battery, means pivotally connecting the battery support to the linkage structure for permitting the battery support to rock between an operative position wherein the battery is supported within the compartment and a maintenance position wherein the battery is located outwardly of the compartment, said means pivotally connecting also for maintaining the battery in a preselected attitude as the support is rocked between positions, and wherein the four-bar linkage structure includes a pair of spaced upright bars defining a gap therebetween, and plate means connected to one of the bars and spanning the gap for eliminating a pinch point between the bars.

5. The invention as set forth in claim 4 wherein the linkage structure includes stop means for automatically stopping and maintaining the battery support in the maintenance position.

6. The invention as set forth in claim 4 wherein the plate means includes means for preventing the battery support from rocking beyond the operative position as the support is rocked from the maintenance position.

* * * * *